No. 717,473. Patented Dec. 30, 1902.
O. TIPTON.
SEED PLANTER AND FERTILIZER DISTRIBUTER.
(Application filed July 16, 1902.)
(No Model.) 2 Sheets—Sheet 1.
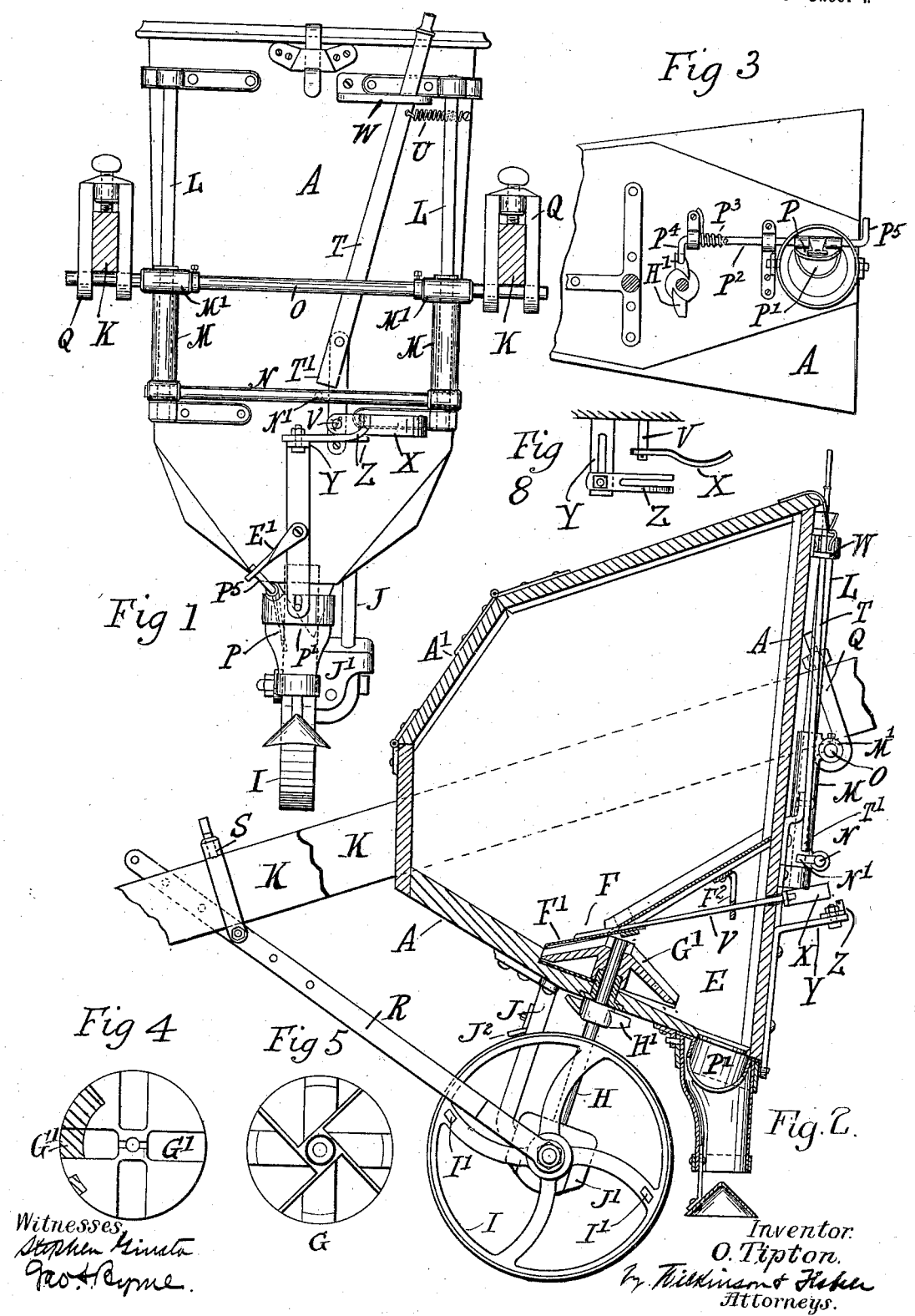

No. 717,473. Patented Dec. 30, 1902.
O. TIPTON.
SEED PLANTER AND FERTILIZER DISTRIBUTER.
(Application filed July 16, 1902.)
(No Model.) 2 Sheets—Sheet 2.
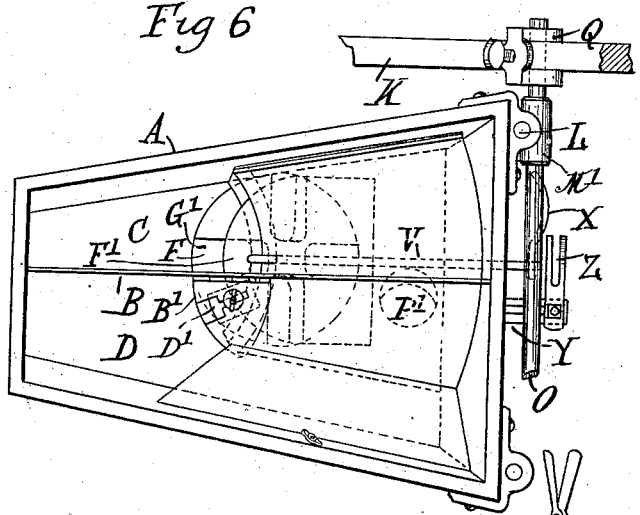
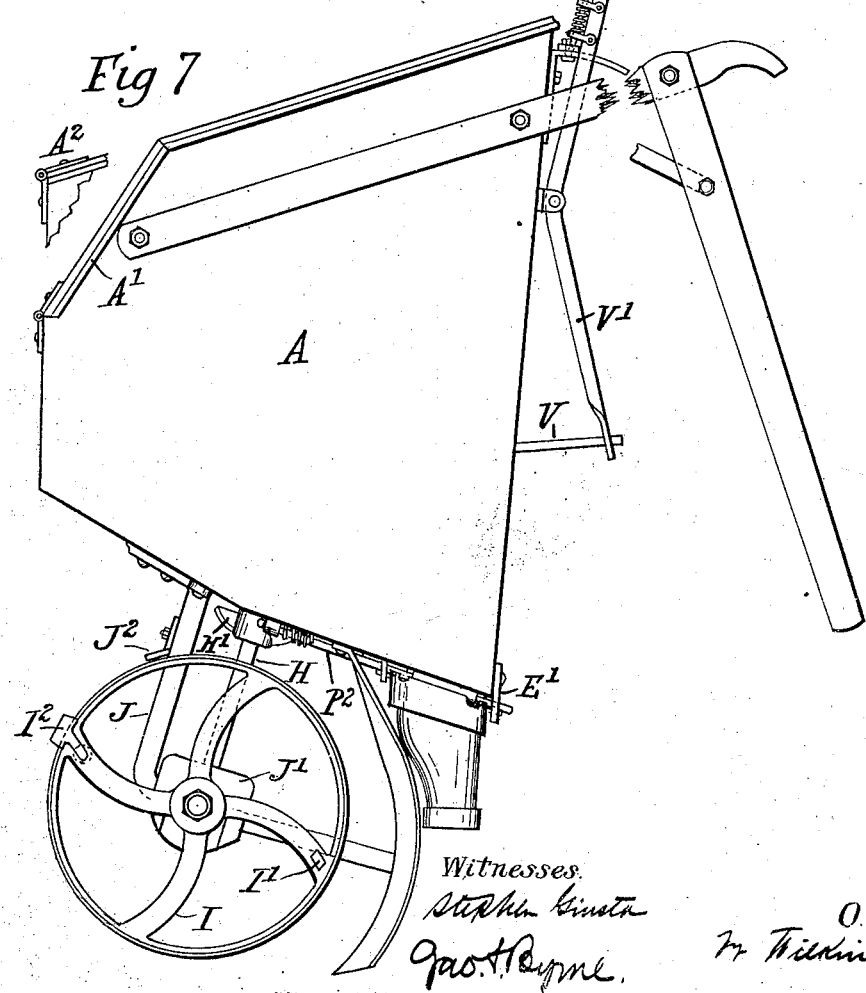
Witnesses.
Inventor:
O. Tipton.
Attorneys.

UNITED STATES PATENT OFFICE.

OSBORN TIPTON, OF CARLTON, VICTORIA, AUSTRALIA.

SEED-PLANTER AND FERTILIZER-DISTRIBUTER.

SPECIFICATION forming part of Letters Patent No. 717,473, dated December 30, 1902.

Application filed July 16, 1902. Serial No. 115,857. (No model.)

*To all whom it may concern:*

Be it known that I, OSBORN TIPTON, a subject of King Edward VII of Great Britain and Ireland, residing at 189 Drummond street, Carlton, in the State of Victoria, Commonwealth of Australia, have invented certain new and useful Improvements in Seed-Planters and Fertilizer-Distributers, of which the following is a specification.

The object of this invention is to provide mechanism for distributing from a hopper fertilizer or seed, or both, the amount distributed being regulated and provision made for the distribution either continuously or at intervals. The matter distributed may on dropping be spread out by an attachment provided, and means are also provided for marking the soil when required at regular distances to facilitate subsequent separate handsowing (of, for example, potatoes) at proper intervals.

My mechanism may be attached to a plow, single furrow or other, or be provided with handles and propelled as a barrow. The distributing is effected by a feed-wheel revolved by the motion of the wheel which is used as the hopper-support and runs upon the ground, its axle being provided with a bevel-wheel gearing into a bevel-wheel on the spindle of the feed-wheel, the latter being fitted within the base of the hopper. As said feed-wheel rotates it carries the material from one (or two) compartments of the hopper into a chamber from which it may drop to the soil either at once or at intervals, according to the adjustment of the machine.

A drill or cultivating tooth may be attached to the machine, taking the place of the plowshare when the barrow form is used.

There may be sown many varieties of seed, such as grain, peas, wheat, oats, mangolds. Where sowing or distributing is to be continuous, the exit of the chamber to which the feed-wheel carries the material is left unobstructed; but when it is to be intermittent the exit is normally closed by a door or shutter, and the action of a suitable attachment causes (at regular intervals) the opening of the door, a spring or the like closing it. At each opening the material which has reached the door falls, and when a furrow has been made by plow or drill it falls thereinto.

Other details will be understood from the drawings which accompany this explanation of the invention, and in which—

Figure 1 is a rear view of the mechanism in the form adapted to be attached to a plow, the handles of the latter being indicated in transverse section. Fig. 2 is a side elevation, partly in vertical section, showing part of Fig. 1. Fig. 3 is a plan view from below the hopper, showing the aforesaid door and connected parts. Figs. 4 and 5 are plan views of the feed-wheel from above and below, respectively, Fig. 4 having certain areas shown by hatching, as hereinafter referred to. Fig. 6 is a plan view from above showing principally the interior of the hopper, the lid of the latter being removed. Fig. 7 is a side elevation showing a drill and barrow handles attached to the hopper, and Fig. 8 is a detail in plan view.

Referring now to the lettering upon the drawings, A is a hopper having a removable partition B, fertilizer (in a well-divided state) and seed being placed in the respective compartments C D (see Fig. 6) so formed. When the partition is removed, all seed or all fertilizer may be used.

E is a chamber below C and D, into which material is carried, as hereinafter described. The beveled portion A' is to avoid obstruction of the plowman's forward view, Fig. 2. Hence the hopper-corner may be put in the position marked A² in Fig. 7 instead of using the bevel A'. At the lower part of the said compartments C D, to which the sides and base thereof slope, is an aperture F, which is filled by part of a feed-wheel G, having depressions or pockets, as G', and a spindle H, the lower end of which is fitted with a bevel-wheel gearing with another on the axis of the supporting-wheel I, which runs upon the ground. In the drawings a casing J' is shown inclosing the said bevel-wheels, while J is the bracket or support at the base of which the axle of wheel I is journaled.

J² is a scraping attachment to keep the tire clean, while I' are apertures at one or more parts of wheel I, in which may be attached to said wheel when desired one or more ears I², projecting beyond the wheel-tire, as seen in Fig. 7, and adapted to indent or mark the soil at regular intervals to facilitate the subsequent hand-sowing, before referred to.

To secure the hopper to the plow-handles K, the hopper is provided with guide-rods L, along which may slide sleeves M, fitted around the same. Sleeves M (which are connected by bar N, having a stud or projection N') have fixed thereto bearings M', through which is passed a rod O, which can be fixed to the plow-handles, as by clamps Q.

A suitable brace or attachment is provided to steady the machine, such as bar R, extending forward from the axle of wheel I and pivotally connected to a clamp S upon a plow-handle or other suitable support, as shown in Fig. 2.

The frame formed by the parts M to O is when the machine is distributing or sowing located higher on guides L than is shown in the drawings. By bearing down, however, on the handle K the said frame may be depressed, as shown, until stud N' passes just beneath the lower end T' of a bar or pivoted lever T, which is adapted to automatically yield to allow such passage downward, U being a spring tending to hold said lever, as shown. Then when the handles K rise to their normal height the whole machine illustrated is lifted clear of the soil, and thus ceases to sow or distribute. This action is usually made to take place in turning at the end of a furrow or field. Then when bar T is moved so that its end is clear of stud N' the machine falls by its own weight until wheel I contacts with the earth. A notch or catch at W is provided to enable lever T to be retained clear of N'. This allows the machine to jolt or jump freely while working in uneven ground.

Adapted to wholly or partly close, as required, the aperture F is a movable plate F'. (Shown in closed position in Fig. 2 and partly open in Fig. 6.) As a device for adjusting F' there is illustrated a rod V, working through a guide F², having an external end or handle X, which can be pulled outward and secured in any known manner to adjust plate F'. Thus end X may be swung into a catch or bifurcation Z, (see Figs. 1, 6, and 8,) which itself is on an arm adjustable in position, as by means of a slotted bracket Y. In Fig. 7 the end of V is operated by lever V', having a spring catch and rack. The attendant adjusts the parts according to the rate of discharge from the hopper desired. The exit from chamber E is marked P', P being a door to close said exit when required, P² a rod affixed to said door and suitably supported, P³ a spring tending to keep said door normally closed, and P⁴, Fig. 3, a lug adapted to be raised at intervals by one or more beveled projections H', attached to spindle H and revolving therewith. Every time part H' reaches and raises lug P⁴ it turns rod P² and opens door P, the latter being closed by spring P³ as soon as projection H' has moved clear of lug P⁴. Door P is, however, held open for continuous sowing or distributing by engaging a lug P⁵ on rod P² with a hasp E', Fig. 1. The funnel and the spreader shown beneath door P may be removed at will. By hanging the funnel loosely vertical fall of material from chamber E is promoted, and flexible material is generally used, so that the funnel will yield to external pressure encountered during work.

In the seed-compartment D an adjustable plate D' is used to regulate the size of the opening through which seed must pass before it can reach the wheel G. The plate may be held in adjustment by any convenient means.

On Fig. 4 hatched lines show the respective areas of the wheel G uncovered in Fig. 6. The slide or plate D' in Fig. 6 is part of a larger plate B' at the seed-compartment base. B' partly covers wheel G, and it is convenient to attach or hinge it to partition B, so that when B is removed B' and D' go with it.

As is obvious, some features of the construction described may be modified and some replaced by known equivalents, and my claims are to be understood as not excluding the same so far as accords with the spirit of this invention.

What I claim as my invention, and desire to secure by Letters Patent of the United States, is—

1. In a seeder or planter, the combination with a hopper, of a chamber below said hopper, a communicating passage between said hopper and chamber, a substantially vertically supported feed-wheel mounted in said chamber and operating in said communicating passage, between said hopper and chamber in a substantially horizontal plane for delivering the contents of said hopper to said chamber in predetermined quantities, and a movable plate controlling the delivery of the contents of said hopper to said feed-wheel.

2. In a seeder or planter, the combination with a hopper, of a chamber below said hopper, a communicating passage between said hopper and chamber, a feed-wheel mounted in said chamber and operating in said communicating passage, between said hopper and chamber in a substantially horizontal plane for delivering the contents of said hopper to said chamber in predetermined quantities and a movable plate above said feed-wheel for controlling the delivery of the contents of said hopper to said feed-wheel.

3. In a seeder or planter, the combination with a hopper, of a chamber below said hopper, an exit for said chamber, a communicating passage between said hopper and chamber, and a feed-wheel having a grooved beveled upper surface mounted in said chamber adjacent said communicating passage, and operating therebetween for delivering the contents of said hopper to said chamber in predetermined quantities.

4. In a seeder or planter, the combination with a hopper, of a chamber below said hopper, a communicating passage between said hopper and chamber, a feed-wheel having a grooved beveled upper surface for delivering the contents of said hopper to said chamber in predetermined quantities, said feed-wheel being mounted in said chamber and operating in said communicating passage, and a movable plate above said feed-wheel for controlling the delivery of the contents of said hopper to said feed-wheel.

5. In a seeder or planter, the combination with a hopper, of a vertical removable plate dividing said hopper into two compartments, a chamber below said hopper, a communicating passage between said hopper and chamber, a feed-wheel operating in said chamber adjacent said communicating passage, a movable plate operating in said communicating passage above said feed-wheel, and means located above said movable plate for further controlling the delivery of the contents of one of said compartments to said feed-wheel.

6. In a seeder or planter, the combination with a hopper, of a vertical removable plate dividing said hopper into two compartments, a chamber below said hopper, a communicating passage between said hopper and chamber, a removable plate operating in said communicating passage for opening and closing same, and an adjustable slide supported by said removable dividing-plate for further controlling the delivery of the contents of one of said compartments.

7. In a seeder or planter, the combination with a hopper, of a chamber below said hopper, an exit-opening in said chamber, a communicating passage between said hopper and chamber, a feed-wheel for delivering the contents of said hopper to said chamber in predetermined quantities, said feed-wheel being mounted in said chamber adjacent said communicating passage, a movable plate operating in said communicating passage for controlling the delivery of the contents of said hopper to said wheel, and mechanism for opening and closing the exit of said chamber.

8. In a seeder or planter, the combination with a movable support provided with suitable handles, of a hopper suspended from said handles, a feed-wheel, an operating-wheel suspended from said hopper, connections between said operating and feed wheels for rotating the latter, and means carried by said handles for lifting and retaining said hopper and operating-wheel clear of the ground upon the depression and elevation of said handle.

9. In a seeder or planter, the combination with a movable support provided with suitable handles, of a hopper suspended from said handles, a feed-wheel, an operating-wheel suspended from said hopper, connections between said hopper and feed-wheels for rotating the latter, and means for lifting said hopper and operating-wheel, comprising guide-rods on said hopper, a slide on said guide-rods connected to said handles and a spring-operated locking-lever adapted to engage said slide.

10. In a seeder or planter, the combination with a movable support provided with suitable handles, of a hopper, a feed-wheel, an operating-wheel suspended from said hopper, connections between said operating and feed wheels for rotating the latter, guide-rods on said hopper, a frame adapted to slide on said guide-rods, connections between said frame and handles, and means for locking said frame to said hopper upon the depression of said handles.

11. In a seeder or planter, the combination with a movable support provided with suitable handles, of a hopper, a feed-wheel, an operating-wheel suspended from said hopper, connections between said operating and feed wheels for rotating the latter, guide-rods on said hopper, a frame adapted to slide on said guide-rods, connections between said frame and handles, a lug on said frame, and a spring-operating lever adapted to engage said lug upon the depression of said handles and frame.

12. In a feeder or planter, the combination with a hopper, of a chamber below said hopper, a communicating passage between said hopper and chamber, a substantially horizontally disposed feed-wheel, mounted on an elongated spindle, in said chamber adjacent said communicating passage, an operating-wheel suspended from said hopper, gearing between said spindle and operating-wheel, and a movable plate operating in said communicating passage for controlling the delivery of the contents of said hopper to said feed-wheel.

13. In a seeder or planter, the combination with a hopper, of a chamber below the same, a communicating passage between said hopper and chamber, an operating-wheel suspended from said hopper, a spindle in operative engagement with said wheel and projecting into said chamber adjacent said communicating passage, a feed-wheel mounted on said spindle, an exit-opening for said chamber, a spring-operated door for normally closing said exit and having a rod or extension thereon, and cam-faced lugs mounted on said spindle adapted to engage said rod for operating said door at intervals of time.

In testimony whereof I affix my signature in presence of two witnesses.

OSBORN TIPTON.

Witnesses:
 G. G. TURRI,
 W. H. CUBLEY.